T. S. TINCHER.
Car-Axle Boxes.

No. 151,251.                                            Patented May 26, 1874.

ATTEST:
Robert Burns.
H. T. Tanner.

INVENTOR:
Timothy S. Tincher
By Knight Bros
Attys.

UNITED STATES PATENT OFFICE.

TIMOTHY S. TINCHER, OF ST. LOUIS, MISSOURI.

IMPROVEMENT IN CAR-AXLE BOXES.

Specification forming part of Letters Patent No. 151,251, dated May 26, 1874; application filed February 24, 1874.

*To all whom it may concern:*

Be it known that I, TIMOTHY S. TINCHER, of St. Louis, St. Louis county, Missouri, have invented a certain Improvement in Journal-Bearings for Free-Turning Car-Wheels, of which the following is a specification:

This invention relates to the journal-bearings of that class of car-wheels in which the wheel has free rotation on a fixed axle. The first part of my invention consists in the provision of a stuffing-box on the inside of the hub through which the spindle of the axle passes, to prevent the escape of oil from the oil box or chamber, and the entrance of dust, the outer end of the oil-chamber being closed by a cap removably attached to the hub of the wheel. The second part of my improvement consists in a segmental skein that lies in a suitably-formed groove or recess on the under side of the axle-spindle, and extending up sufficiently on each side. The skein is held in by the linchpin. It takes the wear of the wheel upon the spindle, and is renewable, so that by the removal of the skein and the introduction of a new one, the spindle is restored to its original dimensions. The third part of my improvement consists in the construction of a bush which occupies the center of the hub, and which has a rectangular portion resting in a suitable recess in the hub, so as to prevent the turning of the bush in the hub. The bush-piece has also a circular flange, which is bolted to the outer face of the hub beneath the flange of the close cap, covering the outer end of the oil-chamber.

Figure 1:
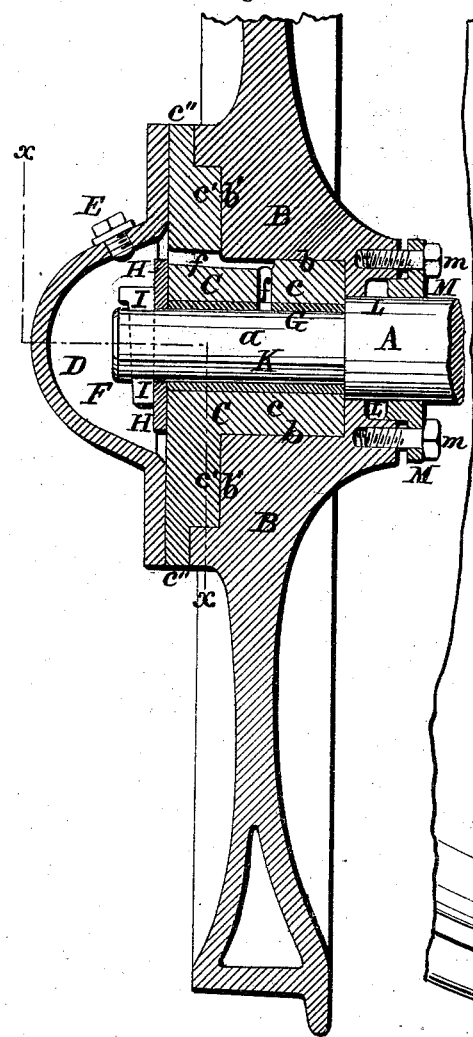
Figure 2:
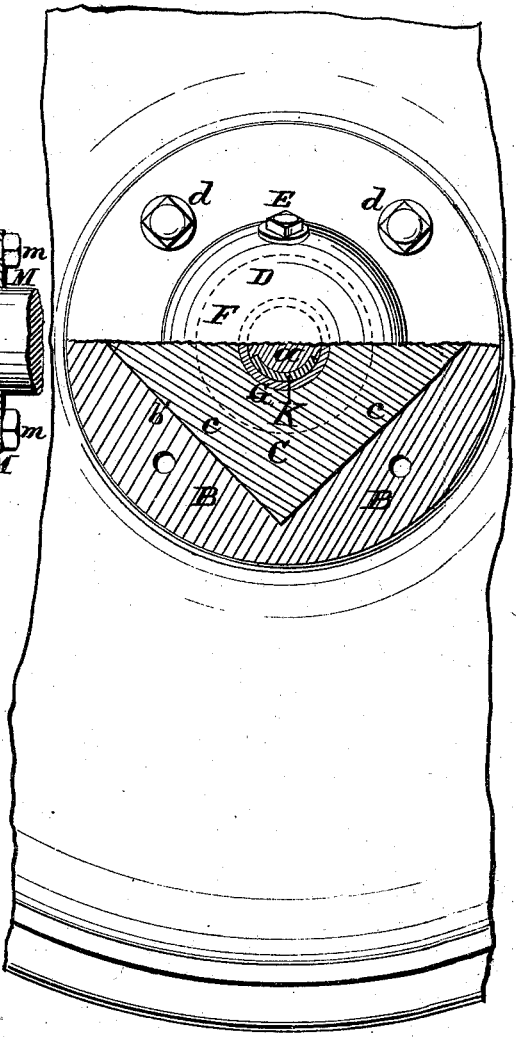

In the drawings, Figure 1 is an axial section. Fig. 2 shows in one-half an end view, and one-half a section, at the line $x\,x$.

A is a portion of the axle, which may be firmly secured to the truck or car, either with or without the interposition of springs. B is the hub of the wheel, having a central cylindrical chamber, $b$, extending inward from a rectangular recess, $b'$, in the outer face of the hub. C is the bush-piece, which has a cylindrical portion, $c$, fitting in the chamber or recess $b$, and a rectangular portion, $c'$, fitting in the recess $b'$, to prevent the bush from turning in the hub of the wheel. $c''$ is a circular flange, fitting tightly against the outer face of the hub, and secured thereto by the same bolts, $d$, by which the close dome-shaped cap D is secured to the hub.

Gaskets may be interposed in the joints between the cap and the hub, to render the joints tight.

E is a screw, stopping the hole through which oil is introduced into the chamber F. $f$ is an oil-hole in the bushing C leading inwardly. The cap D closes tightly the outer end of the axle to prevent the escape of oil, or entrance of dust. G is a bearing-surface of babbit-metal, cast in the bushing-piece C. H is a washer, bearing against the face of the hub, and held on the spindle $a$ by a linchpin, I. K is a segmental skein, preferably formed of steel, which rests in a recess in the lower side of the spindle suitably formed to receive it, and extends upward on each side a sufficient distance to form the wearing-surface of the spindle.

This skein is removable, so that a new one may be substituted at any time to restore the spindle to its original dimensions. The bearing-surface in the hub is also renewable by the substitution of a new bush-piece, C, in place of a worn one, so that at any time—without the removal of a wheel—the bearing-surface may be renewed on both wheel and axle, by merely supporting the end of the axle, removing the cap D and bush-piece C, and drawing up the linchpin, and drawing out the skein, and substituting a new bush-piece and skein, and fastening them in position by forcing down the linchpin through the hole in the skein, and again screwing on the cap D. The babbit-metal bearing is renewable in the bush-piece C by the ordinary means.

The oil is retained on the inner side by a stuffing-box having a stuffing, L, of leather or other suitable substance, held in by the cap M, secured and adjusted by bolts $m$.

I claim as my invention—

1. The oil-chamber F, closed at one end by a close cap, D, and at the other by a stuffing-box, L, and adjustable cap M, in combination with the wheel B and axle A, all constructed to operate as set forth.

2. The removable segmental skein K, in combination with the spindle $a$ and linchpin I, substantially as and for the purpose set forth.

3. The removable bush-piece C, provided with the angular collar $c'$, to prevent the rotary motion of the bush in the hub, and a circular flange, $c''$, tightly fitting the face of the hub, and the cap D to prevent the escape of oil from the chamber F, all combined substantially as set forth.

TIMOTHY S. TINCHER.

Witnesses:
SAML. KNIGHT,
ROBERT BURNS.